United States Patent [19]

Muskulus

[11] 4,269,235
[45] May 26, 1981

[54] METHOD AND APPARATUS FOR WINDING A PLURALITY OF WINDINGS THAT ARE TO BE COLLECTED IN A STATOR SHEET PACKET

[75] Inventor: Willi Muskulus, Frankfurt am Main, Fed. Rep. of Germany

[73] Assignee: Balzer & Dröll, Niederdorfelden, Fed. Rep. of Germany

[21] Appl. No.: 14,545

[22] Filed: Feb. 23, 1979

[30] Foreign Application Priority Data

Feb. 24, 1978 [DE] Fed. Rep. of Germany ....... 2808050

[51] Int. Cl.³ .............................................. H02F 15/04
[52] U.S. Cl. .................................... 140/92.1; 29/596; 29/736
[58] Field of Search ................. 29/596, 598, 736, 732, 29/564.1; 140/92.1–92.2

[56] References Cited

U.S. PATENT DOCUMENTS 3,672,026 6/1972 Cutler et al. ........................ 29/596 X
3,724,515 4/1973 Eminger .............................. 140/92.1

FOREIGN PATENT DOCUMENTS 1589860 12/1973 Fed. Rep. of Germany .

Primary Examiner—Carl E. Hall
Attorney, Agent, or Firm—Larson, Taylor and Hinds

[57] ABSTRACT

Method and apparatus for sequentially winding a plurality of windings on a winding form and for transferring the windings sequentially from the winding form to a collecting tool such that the plurality of windings are disposed on a collecting tool for subsequent collection axially through an aperture of a stator sheet packet positioned in adjacency with said collecting tool. In accordance with the invention, during the transition from winding one winding on the form and winding the next winding on the form, the winding wire is held clamped at a point within the peripheral region of the windings disposed on the collecting tool to be drawn through the aperture during subsequent collection. This arrangement offers great simplicity compared to known systems since the forthcoming path of movement of the clamping means is short and simple and because the available relative motion of conventional parts of conventional devices may be utilized to actuate the clamp, thus eliminating the need for a separate drive or control.

15 Claims, 13 Drawing Figures

1

METHOD AND APPARATUS FOR WINDING A PLURALITY OF WINDINGS THAT ARE TO BE COLLECTED IN A STATOR SHEET PACKET

FIELD OF THE INVENTION

The invention relates to a process and device for winding a plurality of windings or groups of windings staggered about the periphery that are to be collected axially in a stator sheet packet, without interruption of the wire.

It is customary in the manufacture of stators for electric machines to prewind the windings or groups of windings on a form, and to collect them axially into the stator grooves by means of a suitable collecting tool. Here the effort is made, if possible, to collect in the stator a plurality of windings or groups of windings that are mutually staggered about the periphery, without interruption of the wire. The windings thus wound and interconnected are successively transferred by strippers from the form to a transfer tool that can be moved intermittently in the direction of rotation, or they are transferred directly to a collecting tool and collected together into a stator sheet packet. One type of transfer tool that receives the successively wound windings or groups of windings according to a stepwise indexing is of such design that the windings, like the form, will keep relatively taut over the whole periphery. Such transfer tools that hold the windings taut over their periphery are very large and heavy, however, and they have other disadvantages that have had the effect that usually the transfer or collecting tool which receives the windings from the form will guide them only into two slits respectively, i.e. at two points on the periphery, and hold them loosely. In this case, in order to prevent a retraction of the wire from the previous winding, it is known that the wire can be clamped pointwise with a clamping device beyond the circulating path of the winding nozzle, to pull and positively hold the necessary length of wire in starting the winding, between the windings for the case in question, until the winding nozzle has completed the first winding. This clamping device moves with three degrees of freedom and holds the wire until some turns for the next winding have been produced on the form which then, in the continuation of the winding process, can take up the pull in the winding wire. The control and the drive for the clamping device is extraordinarily complicated, and it has to be set up empirically in each individual case, so that the problem with which the invention is concerned is the creation of a winding process and a device suitable for its execution that will essentially eliminate the drawbacks that have been mentioned.

BRIEF SUMMARY OF THE INVENTION

The above problem is solved by the invention in that in the transition from one winding or group of windings to the next, the winding wire is held clamped in that peripheral zone of the windings that will be drawn through the stator hole in the course of the collecting process.

The device that is intended for execution of this process comprises a single-stage or multistage form, a winding nozzle rotatable about the form, and a clamp to hold the wire between successive winding operations. The invention is characterized in that the clamp is disposed on the form and/or a part adjacent thereto, within the path of rotation of the winding nozzle.

DETAILED DESCRIPTION OF PREFERRED EMBODIMENTS

The process of the invention and the device for its execution offer the advantage of greater simplicity in contrast to known arrangements, because the paths needed for the functioning of the clamp are shorter and simpler, and moreover, the axial relative motions of the form and the tool parts cooperating with it, especially the stripper, are utilized to actuate the clamp, so that there is no need for separate drive or control.

The invention is further described below, with reference to the drawings in which.

Figure 1B:
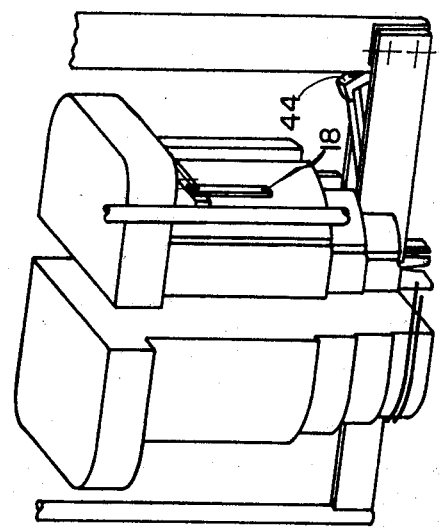
FIGS. 1a and 1b are perspective views of a winding form showing a stripper in two different work positions during execution of the process according to the invention.
Figure 1A:
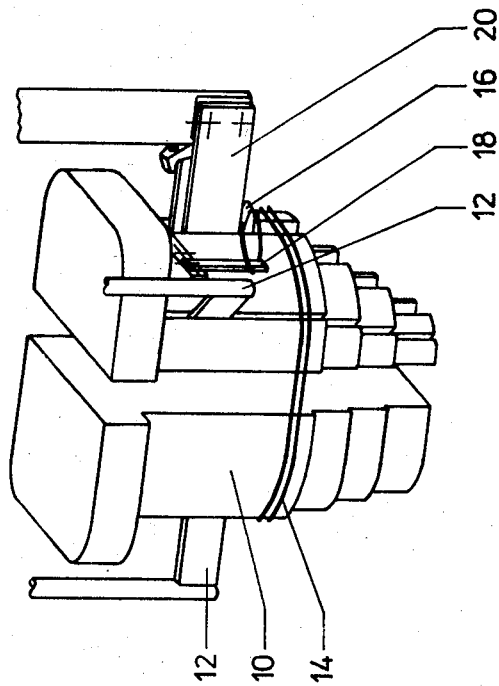

The winding tool shown in FIG. 1a, 1b is essentially of the type described in detail in German OS No. 23 09 837. For this reason, there is no illustration of the winding nozzle and the drive for stripper 12 that acts on form 10. The winding nozzle which is not shown passes around form 10 and thereby produces on the latter, wire windings 14 which for the most part are thrust by stripper 12 in the continuing course of the winding into a conventional transfer or collecting tool that comprises a ring of parallel rods. After a group of concentric windings have been wound with the prescribed number of turns on the different stages of form 10, the remaining windings are stripped from the form over into the prescribed slits of the transfer or collecting tool, by a rather long axial relative movement in whose course stripper 12 is thrust forward over the free end of form 10.

The invention is not restricted to the above described type of forms and strippers. It is immaterial, if during the winding process, part of the windings are thrust into the transfer or collecting tool, or if this is effected by means of stripper 12. The invention relates in particular to the phase in which, after completion of the production of a winding or, in the case of the illustrated example, a group of windings, there is transition to the production of the next following winding or group of windings that is connected with the first.

Figure 2:
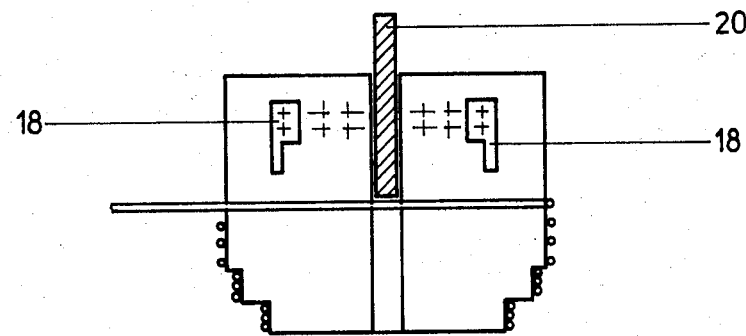
FIG. 2 shows the form according to FIGS. 1a and 1b schematically, in side view.

Reference is made first to FIGS. 3a to 3d, to explain the proposed winding principle. These drawings are limited for the sake of clarity to the representation of groups of windings that are to be produced stepwise in succession without interruption of the wire, each comprising two concentric windings. These groups of windings in the case of the illustrated example are to be wound alternatingly with opposite directions of turning. In order not to produce a sharp bend in the winding wire at the point where the wire is temporarily held clamped by a clamp 16 disposed according to the invention on form 10, and in order also to be able to set the length of the wire connection between the individual groups of windings, there is also disposed on form 10 a hook 18 made as a pin or tongue, about which the wire is temporarily looped during the reversal of the winding direction. Whereas in the production of two interconnected groups of windings, a single hook 18 suffices, if there is a multiple change of direction as in the case of the illustrated example, there will have to be two hooks 18. These hooks 18, according to FIG. 2, are provided on both sides of a part 20 which supports clamp 16; said part 20 may also be a stripper.

The illustrations according to FIGS. 3a to 3d correspond to a top view of the form according to FIG. 1a, 1b, and a transfer tool 22 disposed under it. Form 10 remains during the entire winding process of all winding groups in the position in which the winding group is shown above, in FIGS. 3a to 3d respectively. The completed winding groups that have been stripped over into transfer tool 22 as the succession of FIGS. 3a to 3d shows, are indexed by means of transfer tool 22 which can be shifted intermittently counterclockwise, so that at the end according to FIG. 3d four complete groups of windings hang in the slits between the rods of the transfer or collecting tool 22.

The winding operation is as follows in detail.

Figure 3A:
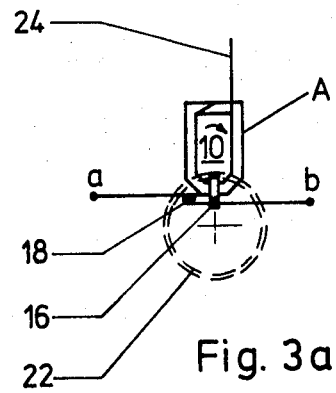
FIGS. 3a to 3d are schematic illustrations of successive winding movement in the production of a 4-pole winding comprising four groups of windings.

The first winding group in the example according to FIG. 3a is wound clockwise, whereby the winding process begins with the smaller winding, i.e. on the smaller stage of form 10. The lead end of the wire is indicated by numeral 24. After the winding of the prescribed number of turns on both the smaller and the larger stage of form 10, the winding nozzle is in position a with reference to form 10. The form 10 is now lowered with reference to the winding nozzle so that a first hook 18 engages the wire that leads to the winding nozzle. At the same time, because of the downward movement, clamp 16 is swung outward from a retracted position in form 10 at the level of the winding nozzle, or thrust forward, whereby the jaws of the clamp open. When now the winding nozzle is caused to travel back about a half turn counterclockwise into the indicated position b, the wire lays itself about hook 18 and enters the opened jaws of clamp 16. This position of the parts and of the wire is shown in FIGS 1a and 3a.

In the next work step, the windings of the first group of windings still on form 10 (designated A in FIG. 3a), are thrust by a downward movement of stripper 12 and also of part 20 if this is provided, into the slits between the rods of transfer or collecting tool 22. During this movement of the stripper, clamp 16 closes and holds the winding wire pointwise, fixedly clamped. The clamping place is radially inside the ring of rods or lamellae of transfer or collecting tool 22, hence, it is in that peripheral region of the winding or group of windings A which in the subsequent collecting process will be pulled through the hole of a stator sheet packet brought into position on the collecting tool. During the stripping process, the wire is pushed out of hook 18. After all windings of group A have been stripped from form 10 and the form as well as stripper 12 has been retracted from the region of transfer tool 22, the latter is shifted on by 90° clockwise, whereby the first wound group A will be transported in the direction of arrow 26 into the position shown in FIG. 3b.

After the stripping of winding group A, form 10 and stripper 12, 20 are returned to the starting position, i.e., the axial position with reference to the winding nozzle in which upon rotation of the winding nozzle, wire windings will be laid on the smaller form stage. Clamp 16 remains closed at first.

In the illustrated example of a 4-pole winding, the next group B is wound counterclockwise, without interruption of the wire. Because in the running up of the winding nozzle, clamp 16 is still closed, there remains a loop of wire as shown in FIG. 3a between clamp 16 and hook 18 as a free length of wire connecting the two winding groups A and B, i.e. this length of wire is not pulled into winding group B by the pull exerted on the wire by the winding nozzle. After several turns, e.g. three to five turns, have been produced on the smaller stage of form 10, clamp 16 is released, because now the windings seated on the form can take up the tensile force in the wire. After the release of clamp 16, strippers 12 can in a known way strip down most of the wire windings laid on form 10, from form 10 down between the rods or lamellae of transfer or collecting tool 22, by short strokes with the frequency of the circulation of the winding nozzle, even during the continuing winding process. Experience shows that at the end of each form stage only a few turns remain which must be thrust by a long stripping stroke of strippers 12 into transfer tool 22.

Figure 3C:
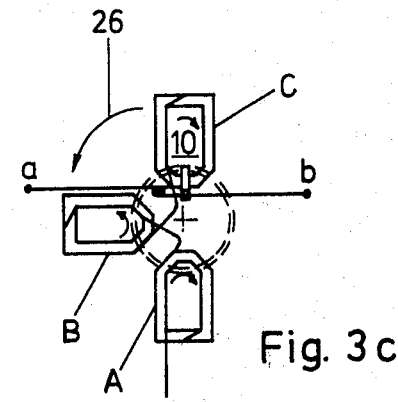
Figure 3B:
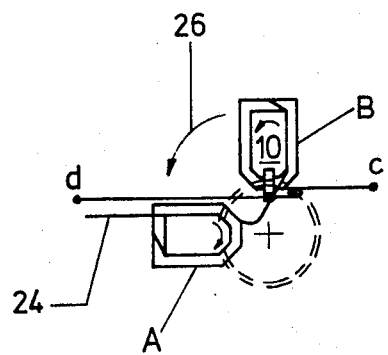
Figure 3D:
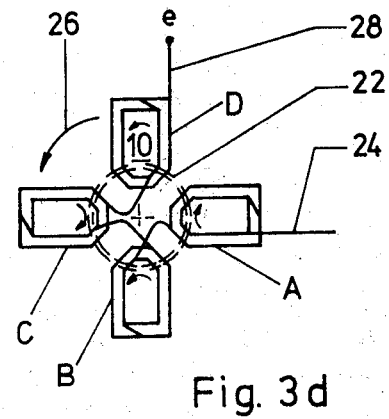

After production of the prescribed number of turns for winding group B, the winding nozzle at first remains in the position with reference to form 10 that is shown in FIG. 3b and designated c. When thereupon the form is lowered, this time the second of the two hooks 18 engages the wire that leads to the winding nozzle. With the subsequent reversal of the winding nozzle by about half a clockwise revolution to position d (FIG. 3b) it forms a wire loop, while the wire is again laid in the open jaws of clamp 16. The winding nozzle is now in position d and keeps this angular position during the following stripping operation of the turns that remain from group B onto form 10.

Transfer or collecting tool 22 is then moved along, whereby winding groups A and B reach the positions shown in FIG. 3c. Thereupon, in the same way as in the case of the first winding group A, the third group C is wound, and after another shift forward of collecting tool 22 the fourth group D is then wound in the same direction as winding group B. At the end, the winding nozzle stops in a position e (FIG. 3d) in which the trailing end of the wire designated by numeral 28 is cut off.

In FIG. 3a to 3c the respective positions a and d, and b and c of the winding nozzle are drawn closely adjacent, to be able better to show the loop formation of the wire between clamp 16 and hooks 18. In practice, positions a and d as well as positions b and c may be identical. The length of the loop between clamp 16 and hooks 18 can be varied since hooks 18, as shown in FIG. 1a and 1b can be fixed with different spacing from clamp 16 on form 10. In every case with a renewed runup of the winding nozzle, the loop is released without a sharp bend remaining in the wire.

If only two winding groups are to be wound with a different direction of winding, without interruption of the wire, a single hook 18 on form 10 is sufficient. If all windings or groups of windings are to be wound in the same direction, there is no need for hook 18, since in this case, normally the peripheral distance between the windings is just as large as the peripheral section taken by each winding. Therefore, even without hook 18 and the loop produced thereby, the correct length is produced as a connection between the different windings or groups of windings. In addition, a change of this wire length, the so-called shift connection, is also possible because the clamp at the moment of closing is extended more or less a distance out of form 10 or is more or less spaced axially from the forward edge of strippers 12.

As already known, clamp 16 could have a special drive and a special control. However, it is preferred to drive and control clamp 16 with the use of relative axial movements of the parts of the winding tool that are inherently present in the apparatus. Such a preferred embodiment is shown in FIG. 4a to 4f.

Figure 4C:
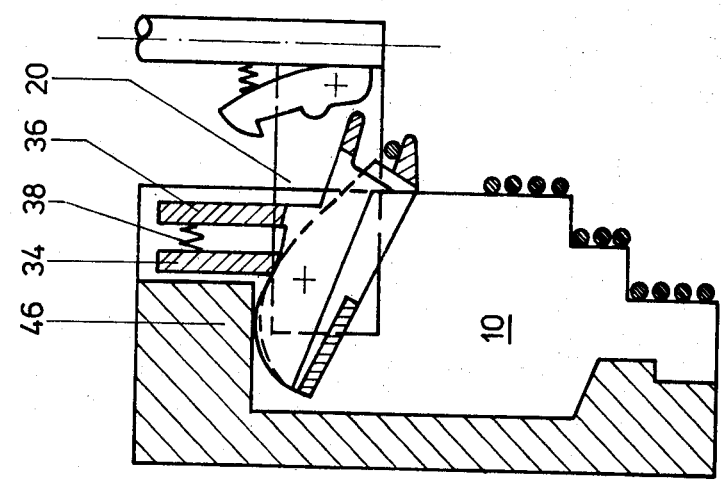
FIGS. 4a to 4f are partial cross sections, in different working positions, through the region of the winding form according to FIGS. 1a and 1b that receives a clamp.
Figure 4B:
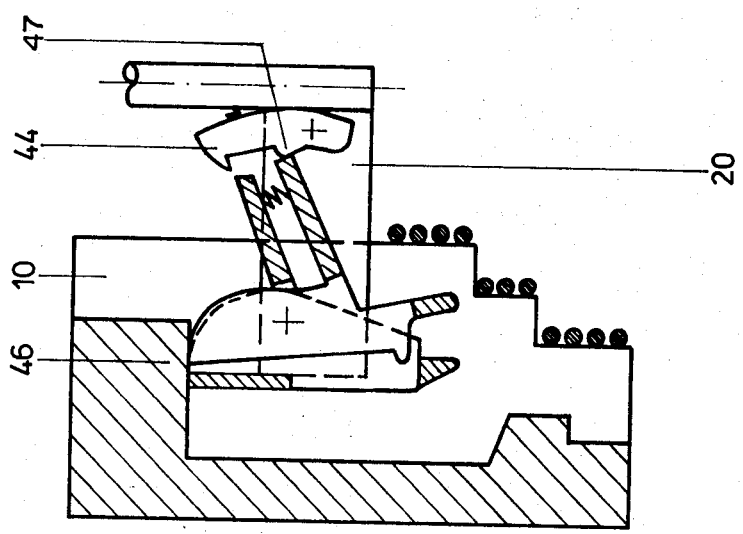
Figure 4A:
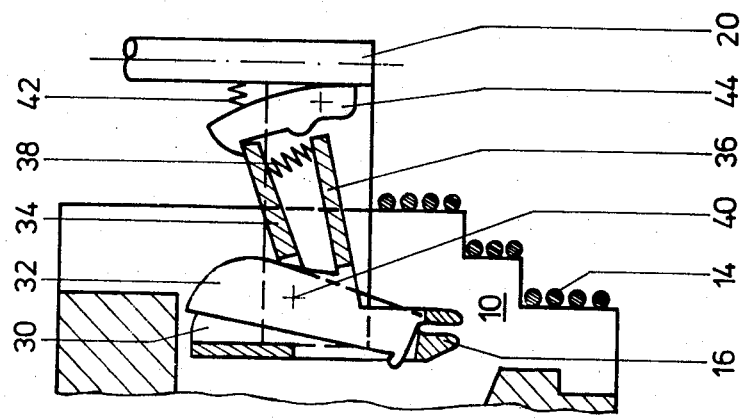

During the winding process, clamp 16 is in the retracted neutral position according to FIG. 4a, in an axial longitudinal slit in form 10. Clamp 16 comprises two articulatedly connected levers 30 and 32, respectively equipped with a side arm 34 or 36. Between side arms 34, 36 there is tensioned a compression spring 38 which loads clamp 16 in the direction of closure. Both levers 30, 32 of clamp 16 are rotatable about their point of articulation which is designated 40, at which point they are articulatedly connected with part 20. Part 20 can, as already mentioned, be a stripper 12 and execute quick short strokes at the frequency of the circulating movement of the winding nozzle, together with the other strippers 12 during the winding process. However, because of the somewhat greater mass on part 20 attributable to clamp 16, it is advisable to take it out of the above mentioned rapid reciprocating motion and let it participate only in the long-stroke stripping motion at the end of the winding of a group of windings. For this purpose, part 20 can be fixed to a flange that is fixed in rotation in a winding tool as shown in German OS No. 23 09 837 for example, which is borne to be fixed in rotation, like for example, a wobble plate that forms the drive for the short-stroke axial movement of stripper 12.

Advantageously, the winding nozzle also executes synchronous axial movements with reference to transfer or collecting tool 22, corresponding to the long-stroke stripping motion at the end of the winding of a winding or a group of windings, so that the length of wire between the clamp and the winding nozzle in the intermediate phases during the stripping and transition to the next group of windings will remain uniform, and there will be no jerking with a new running up.

The long-stroke stripping motion of strippers 12 and possibly 20 with reference to the transfer or collecting tool 22 is further advantageously so adjusted that strippers 12, 20, will travel only a short distance between the lamellae or rods of the transfer or collecting tool 22 independently of the distance which form 10 dips toward collecting tool 22 during a winding process (which depends upon the number of form stages). The depth of penetration normally needs amount to only about 5 to 15 mm. The windings 14 still remaining on the form are stripped off in that in this lowest axial position of strippers 12, form 10 is pulled back up from the lowest position that it assumed during the winding process, over the forward edges of strippers 12. In this way, axial lengths and paths both for the form and the transfer or collecting tool are minimized.

During the winding process, there is a hook 44 swingably disposed on part 20 and loaded by a compression spring 42 toward clamp 16 which ensures that clamp 16 will be held in its neutral position in the slit of form 10. At the end of a winding process, when the winding wire that leads to the winding nozzle is to be engaged by the clamp, form 10 is lowered relative to part 20 so far that a stop 46 on form 10 presses first on the rear ends of both levers 30, 32 of clamp 16 (FIG. 4b) and thereby swings the jaws outward over the periphery of form 10 (FIG. 4c). To facilitate the cooperation of stop 46 with the rear ends of levers 30, 32 of clamp 16, the said lever ends can be rounded as the drawing shows. At the start of the swing motion of clamp 16, the lock by hook 44 is released in that stop 46 first abuts against lever 32 of the clamp whose side arm 36 is not engaged by hook 44. The original motion of rotation of lever 32 then allows side arm 36 to move on, as shown in FIG. 4b, on a cam 47 on hook 44 so that the latter will be pushed back to the outside and side arm 34 of lever 30 that has been held up to that point is released.

Figure 4F:
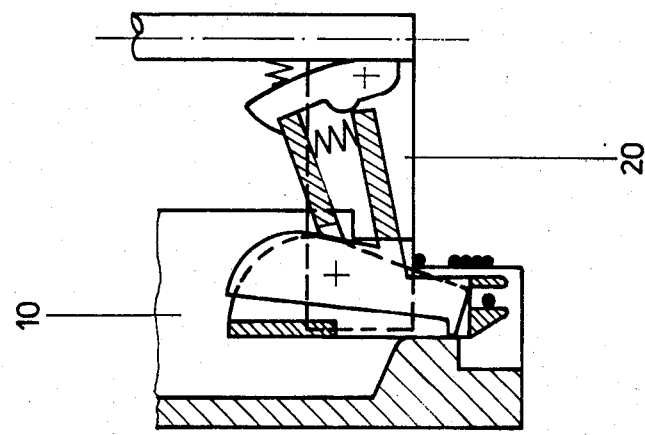
Figure 4E:
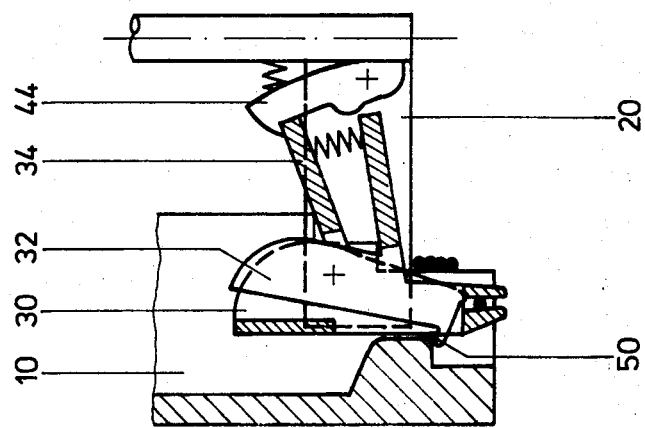
Figure 4D:
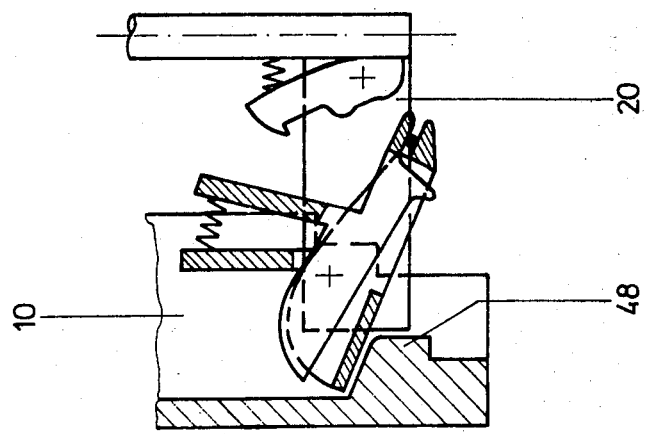

In the end position of the swing motion of clamp 16, stop 46 as shown in FIG. 4c penetrates between the rear end of lever 32 and side arm 34 on lever 30 in such a way that the jaws of clamp 16 are opened, with tensioning of compression spring 38. In this position, by the above described movement, the winding nozzle can go from position a to position b or from position c to position d and the winding wire will be laid in the opened jaws of clamp 16 which is directly below the forward edge of strippers 12, 20 at the level of the plane of winding. At the start of the subsequent stripping stroke of part 20, the rear lever ends and side arms of clamp 16 come free from stop 46 so that the clamp is closed by compression spring 38 and clamps the wire. In the further course of the stripping stroke which part 20 executed with reference to form 10, lever 30 strikes a second stop 48 on form 10 (FIG. 4d) whereby the clamp is swung about articulation point 40 into the position of angular rotation shown in FIG. 4e in which it holds the wire clamped radially within the outer periphery of the smallest form stage. Clamp 16 remains in this position of angular rotation during the last part of the stripping stroke and during the return stroke of strippers 12, 20 with reference to form 10, to the relative axial position in which the next winding process starts on the smallest form stage. Thus, clamp 16 holds the winding wire during the running up of the winding nozzle without preventing production of winding turns on the smallest form stage. The position of the parts as shown in FIG. 4e corresponds to the perspective view of FIG. 1b, except that in FIG. 4e the form is broken away in the region of clamp 16 to allow the clamp to be seen.

In order to be able to thrust most of the windings produced on the smallest form stage during the winding process by the quick short-stroke stripping movement of strippers 12 in the region of the winding plane into the transfer or collecting tool 22 without disturbance, the clamp should release the clamping as soon as enough turns have been wound on the smallest form stage, in order to sustain by friction the wire tension produced by the rotating winding nozzle. For this purpose, after the first few rotations of the winding nozzle, an axial downward movement is made with form 10, in which stop 48, via a cam 50 on lever 32, swings lever 32 counterclockwise while lever 30 is held by hook 44 that engages its side arm 34. This effects the opening of clamp 16 as shown in FIG. 4f, and the clamp remains open as long as stop 48 in the region of the smallest form stage is pressed against cam 50 on lever 32. With further advancing axial movement of form 10 with reference to stripper 12, 20 during the winding of the larger form stage, the clamp returns to the starting position shown in FIG. 4a.

Instead of using the winding form and clamping means described above in combination with a tool capable of inserting the windings into a stator sheet packet it is as well possible first to receive the windings from the winding form in a more simple collecting tool consisting e.g. of only one ring of lamellae and then transfering the windings from this tool into an inserting tool.

What is claimed is:

1. In a method of sequentially winding a plurality of windings on a winding form and for transferring the windings sequentially from the winding form to a collecting tool such that the plurality of windings are disposed on the collecting tool for subsequent collection axially through an aperture of a stator sheet packet positioned in adjacency with said collecting tool, the windings being disposed on the collecting tool such that portions thereof are positioned within a peripheral region which is drawn through the stator aperture during collection, the improvement wherein, during the transition from winding one winding on the form and winding the next winding on the form, the winding wire is held clamped, while said one winding is on said form, at a point within said peripheral region of the windings disposed on the collecting tool which is to be drawn through said aperture during subsequent collection.

2. A method according to claim 1 wherein each separate winding comprises a group of windings.

3. A method according to claim 1 wherein said collecting tool comprises a ring of parallel rods and wherein said point is within the periphery of said ring.

4. In apparatus for sequentially winding a plurality of windings on a winding form and for transferring the windings sequentially from the winding form to a collecting tool such that the plurality of windings are disposed on the collecting tool for subsequent collection axially through an aperture of a stator sheet packet positioned in adjacency with said collecting tool, the windings being disposed on the collecting tool such that portions thereof are positioned within a peripheral region which is drawn through the stator aperture during collection, said apparatus comprising a winding form, winding means comprising a winding nozzle rotatable about said form for forming wire windings on said form, and means for sequentially transferring a plurality of windings from said winding form onto a collecting tool, the improvement comprising clamping means for holding the winding wire clamped, while a winding is on said winding form, at a point within said peripheral region of the windings disposed on a collecting tool which is to be drawn through said aperture during subsequent collection, said clamp being located within the path of rotation of said winding nozzle.

5. Apparatus according to claim 4 wherein said clamping means is mounted on a member adjacent to said winding form.

6. Apparatus according to claim 5 wherein said member is movable axially with respect to said winding form and wherein said clamping means is located in a cavity in said form.

7. Apparatus according to claim 5 wherein said member comprises a stripper for stripping windings from the winding form.

8. Apparatus according to claim 5 further comprising means actuated by relative motion of said member and said winding form for activating said clamping means.

9. Apparatus according to claim 8 wherein said clamping means is pivotably mounted on said member and wherein said winding form includes stops for pivoting said clamping means between a retracted position within the form and a clamping position in which the point of clamping is outside the periphery of said winding form.

10. Apparatus according to claim 9 wherein said clamping means comprises clamping jaws and means urging the jaws in the direction of closing.

11. Apparatus according to claim 10 further comprising stop means for opening said jaws.

12. Apparatus according to claim 4 further comprising at least one hook mounted externally on said winding form remote from the winding zone and means for moving said hook axially of the winding form into the winding zone whereby, on reversing the direction of winding to provide a subsequent separate winding with a different winding direction on said winding form, the hook engages the winding wire thus forming the wire into a loop, said hook being positioned adjacent said clamping means such that wire formed into said loop is then brought into position for clamping by said clamping means.

13. Apparatus according to claim 12 comprising two of said hooks whereby the winding direction can be changed two or more times during a winding process.

14. Apparatus according to claim 12 including means for varying the distance between said hook and said clamping means.

15. In apparatus for sequentially winding a plurality of windings on a winding form and for transferring the windings sequentially from the winding form to a collecting tool such that the plurality of windings are disposed on the collecting tool for subsequent collection axially through an aperture of a stator sheet packet positioned in adjacency with said collecting tool, the windings being disposed on the collecting tool such that portions thereof are positioned within a peripheral region which is drawn through the stator aperture during collection, said apparatus comprising a winding form, winding means comprising a winding nozzle rotatable about said form for forming wire windings on said form, clamping means for temporarily holding the winding wire clamped between consecutive winding operations, and means for sequentially transferring a plurality of windings from said winding form onto a collecting tool, the improvement wherein said clamping means comprises clamp actuating means actuated by engagement with and relative movement of said winding form and an adjacent member.

* * * * *